(12) United States Patent
Reimann et al.

(10) Patent No.: US 6,745,586 B1
(45) Date of Patent: Jun. 8, 2004

(54) SUPPLY AIR DUCT ARRANGEMENT FOR A BUS AIR CONDITIONER

(75) Inventors: Robert C. Reimann, LaFayette, NY (US); Peter R. Bushnell, Cazenovia, NY (US); Stephen Stopyra, Syracuse, NY (US); Belin Czechowicz, Dewitt, NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 10/429,390

(22) Filed: May 5, 2003

(51) Int. Cl.[7] .................................................. B60H 1/32
(52) U.S. Cl. ...................... 62/244; 62/DIG. 16; 454/903
(58) Field of Search ............................ 454/903; 62/239, 62/244, DIG. 16

(56) References Cited

U.S. PATENT DOCUMENTS

| | | | | |
|---|---|---|---|---|
| 2,701,998 A | * | 2/1955 | Wulle ......................... | 454/298 |
| 3,916,639 A | * | 11/1975 | Atkinson ..................... | 62/239 |
| 4,607,497 A | * | 8/1986 | Ferdows et al. ............... | 62/179 |
| 4,909,046 A | * | 3/1990 | Johnson ........................ | 62/244 |
| 4,936,103 A | * | 6/1990 | Newman ........................ | 62/89 |
| 5,007,249 A | * | 4/1991 | Van Druff, Jr. ................ | 62/255 |
| 5,921,100 A | * | 7/1999 | Yoshinori et al. ............. | 62/244 |

* cited by examiner

*Primary Examiner*—William E. Tapolcai
(74) *Attorney, Agent, or Firm*—Wall Marjama & Bilinski LLP

(57) ABSTRACT

A module is provided for attachment to the roof of a bus and includes all of necessary components for conditioning the return air from the passenger compartment and delivering conditioned air thereto. Each module includes an evaporator section, a condenser section and a power section including a compressor and an inverter. The evaporator sections have a return air compartment that extends a substantial distance across the roof of the bus such that a single design can meet the needs of various return air duct installations of various types of buses. Provision is made to interconnect a evaporator discharge opening with a supply air duct for the bus by way of a flexible duct having integrally formed end plates for connection by way of fasteners. The lower end plate which is secured to the supply air duct also includes an upstanding flange for connecting a protective cover thereto.

26 Claims, 7 Drawing Sheets

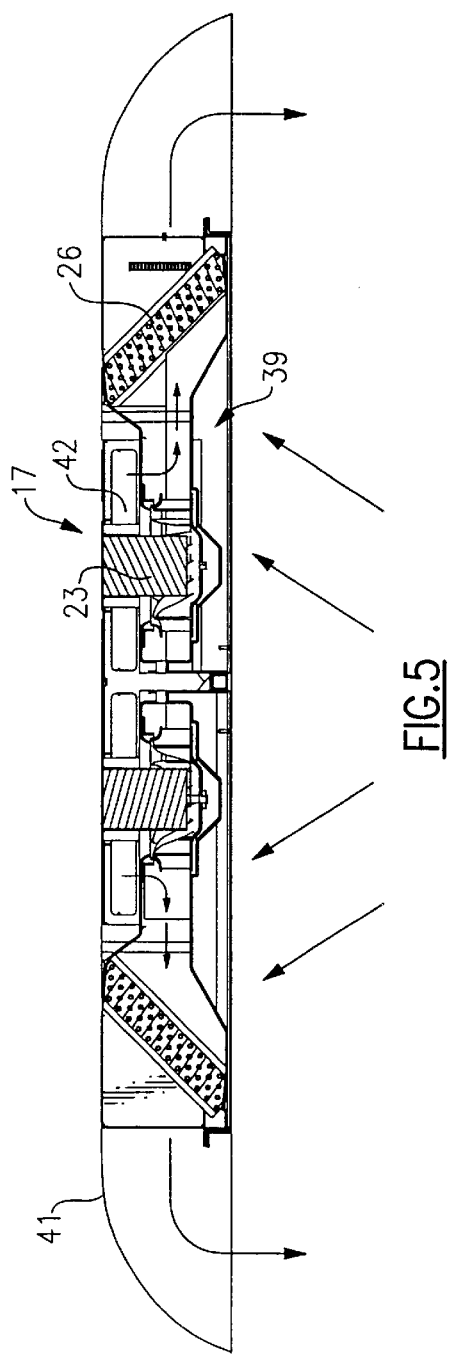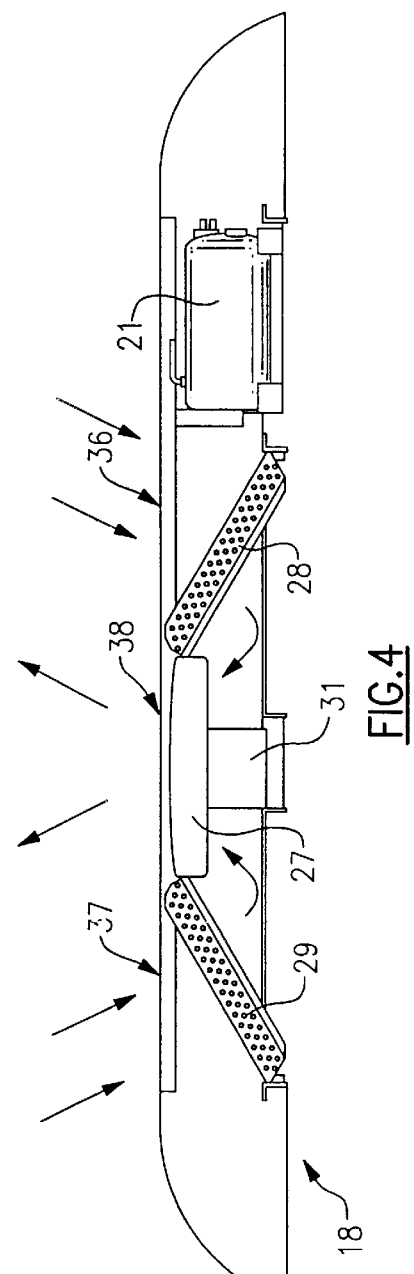

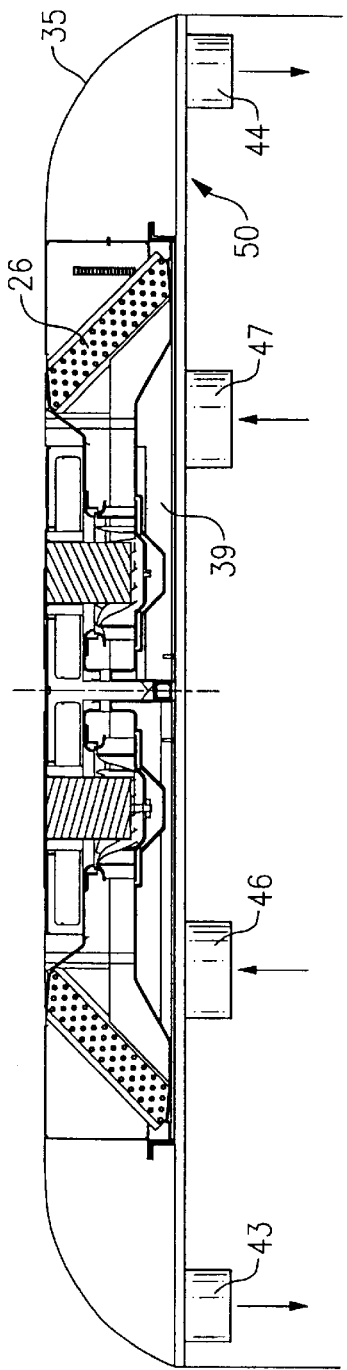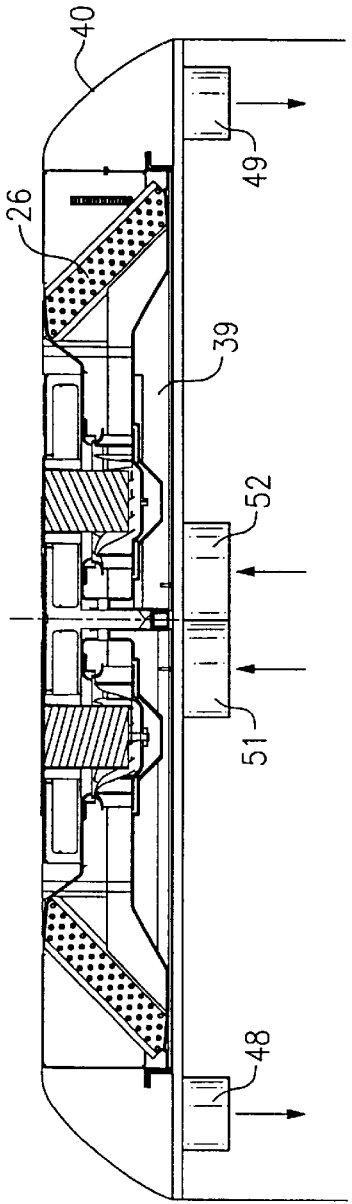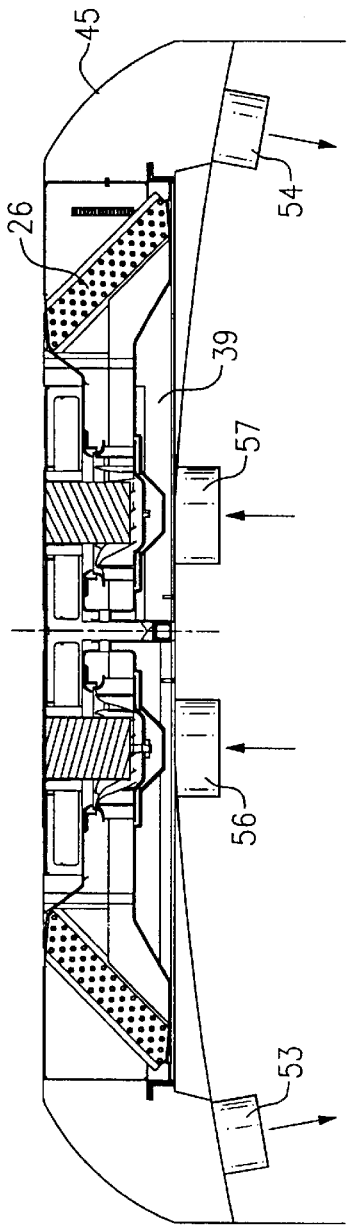

SUPPLY AIR DUCT ARRANGEMENT FOR A BUS AIR CONDITIONER

CROSS REFERENCE TO RELATED APPLICATION

This application is related to the following pending applications being concurrently filed herewith and assigned to the assignee of the present invention:

| Title | Our Docket No.: |
|---|---|
| Modular Rooftop Air Conditioner for a Bus | 210_546 |
| Modular Bus Air Conditioning System | 210_545 |
| Supply Air Blower Design in Bus Air Conditioning Units | 210_549 |
| Bus Rooftop Condenser Fan | 210_550 |
| Method and Apparatus for Refreshing Air in a Bustop Air Conditioner | 210_548 |
| Coil Housing Design for a Bus Air Conditioning Unit | 210_547 |
| Integrated Air Conditioning Module for a Bus | 210_558 |
| Fresh Air Intake Filter and Multi Function Grill | 210_554 |
| Integrated Air Conditioning Module for a Bus | 210_557 |
| Modular Air Conditioner for a Bus | 210_561 |
| Modular Air Conditioner for a Bus Rooftop | 210_562 |
| Evaporator Section for a Modular Bus Air Conditioner | 210_564 |
| Wide Evaporator Section for a Modular Bus Air Conditioner | 210_565 |
| Condensate Pump for Rooftop Air Conditioning Unit | 210_568 |
| Condensate Removal System Rooftop Air Conditioning | 210_551 |
| Modular Rooftop Unit Supply Air Ducting Arrangement | 210_577 |
| Configuration for Modular Bus Rooftop Air Conditioning System | 210_595 |
| Unibody Modular Bus Air Conditioner | 210_596 |

BACKGROUND OF THE INVENTION

This invention relates generally to air conditioning systems and, more particularly, to an air conditioning system for the rooftop of a bus.

The most common approach for air conditioning a bus is to locate the air conditioning components on the rooftop thereof. Inasmuch as power is available from the engine that drives the bus, it has become common practice to locate the air conditioning compressor near the drive engine such that the drive engine is drivingly connected to the compressor, with the compressor then being fluidly interconnected to the air conditioning system on a rooftop of a bus. This, of course, requires rather extensive piping between the engine compartment and the air conditioning unit, thereby increasing installation and maintenance costs.

Another problem with such existing systems is that the speed that the compressor is driven is dependent on the speed in which the drive engine is running. Thus, when the drive engine is idling in a parking lot, for example, the compressor is running at a relatively slow speed which may not be sufficient to provide the desired degree of air conditioning. It is therefore generally necessary to oversize the compressor in order to obtain the performance needed under these conditions.

Others problems associated with such a motor driven compressor system is that the open drive compressor needs a shaft seal and a mechanical clutch, both of which are subject to maintenance problems. Further, since DC power is available on a bus, DC motors have been used for the air conditioning system. In general, DC motors are not as reliable as AC motors since they have brushes that wear out, and brushless motors are relatively expensive.

In addition to the problems discussed hereinabove, it is recognized, that because the wide variety of bus types and application requirements, it has been necessary to provide many different types and variations of air conditioning systems in order to meet these different requirements and vehicle interfaces. As a result, the manufacturing and installation costs, and sustaining engineering resources that are necessary in order to properly maintain and service these units, are relatively high.

It is therefore an object of the present invention to provide an improved bustop air conditioning system.

Another object of the present invention is the provision for a bus air conditioning system which is effective at all operating speeds of the bus, while at the same time does not require an oversized compressor.

Yet another object of the present invention is the provision for reducing the manufacturing, installation, and maintenance costs of a bus air conditioning system.

Yet another object of the present invention is the provision for a bus rooftop air conditioning system which is economical to manufacture and effective in use.

These objects and other features and advantages become more readily apparent upon reference to the following descriptions when taken in conjunction with the appended drawings.

SUMMARY OF THE INVENTION

Briefly, in accordance with one aspect of the invention, an air conditioning module is assembled with its condenser coil, evaporator coil and respective blowers located within the module and so situated that a standard module can accommodate various installation interfaces with different types and locations of return air and supply air ducts on a bus.

By yet another aspect of the invention, each of the identical modules includes all the necessary components with electrical power being provided to the electrical components by an inverter/controller that is powered by a motor driven generator.

By yet another aspect of the invention, a flexible duct is provided with its one end interconnected to the air conditioning module, and its other end connected to the supply air duct of the bus. Such a duct can accommodate openings of varying width and at different lateral spacings from the centerline of the bus.

BRIEF DESCRIPTION OF THE DRAWINGS

FIG. 4 is a front elevational view of the condenser section of the module.

FIG. 5 is a front elevational view of the evaporator section of the module.

FIGS. 6–8 are front elevational views of the evaporator section as applied to different types of bus rooftops.

DESCRIPTION OF THE PREFERRED EMBODIMENT

The inventive module is shown generally at 10 as applied to the rooftop 11 of a bus in accordance with the present invention. Electrical power is provided to the module 10 by way of line 12, which in turn receives its power from a generator 13 driven by the bus engine 14 as shown.

The module 10 interfaces with openings in the bus top so that fans within the module 10 cause the return air from the passenger compartment to flow upward into the module 10 where it is conditioned, and the conditioned air to then flow downwardly into supply air ducts that carry the conditioned air to the passenger compartment. The various structures and the manner in which they interface with the bus rooftop 11 will more fully described hereinafter.

Figure 1:
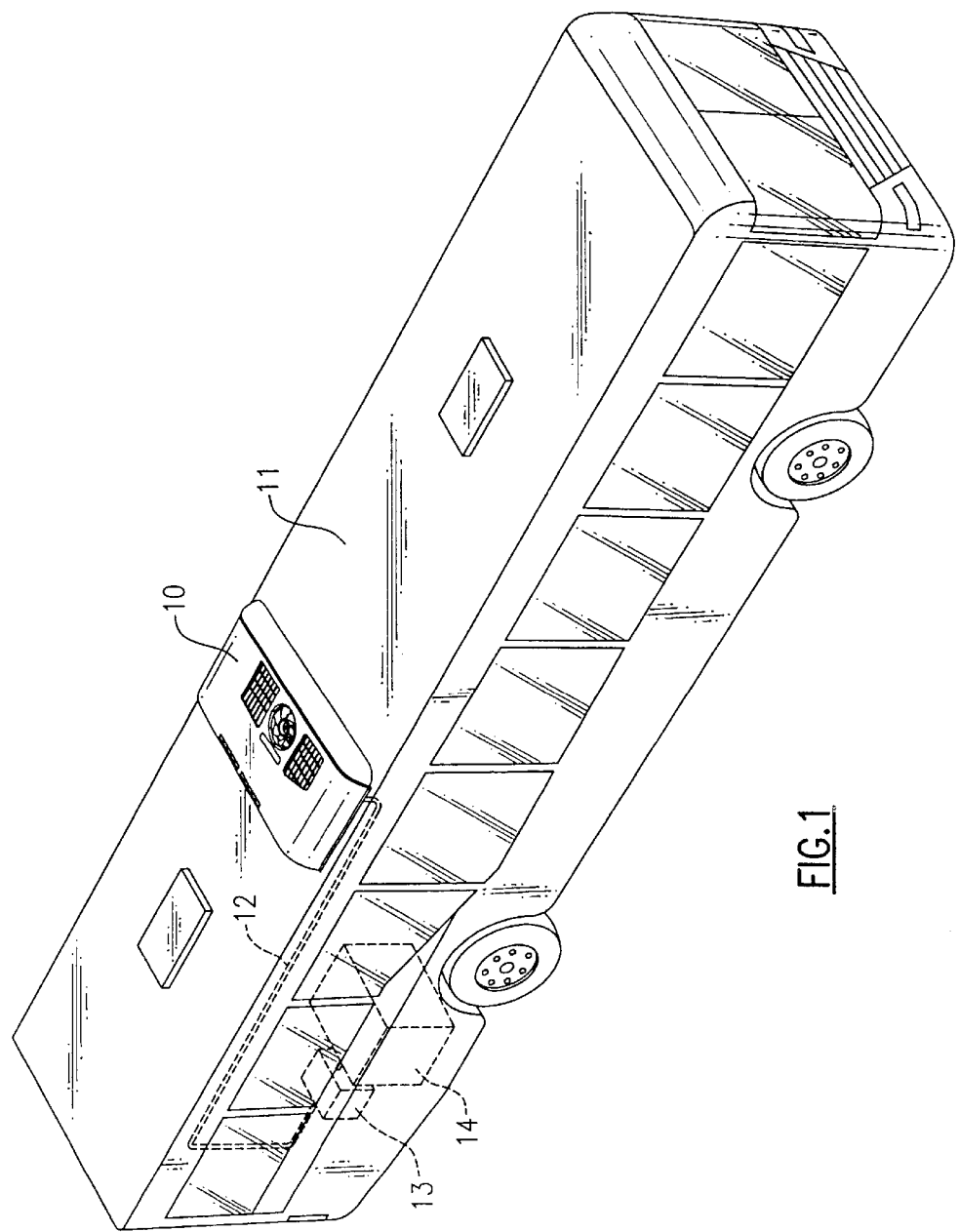
FIG. 1 is a perspective view of a module as installed on the rooftop of a bus in accordance with a preferred embodiment of the invention.
Figure 2:
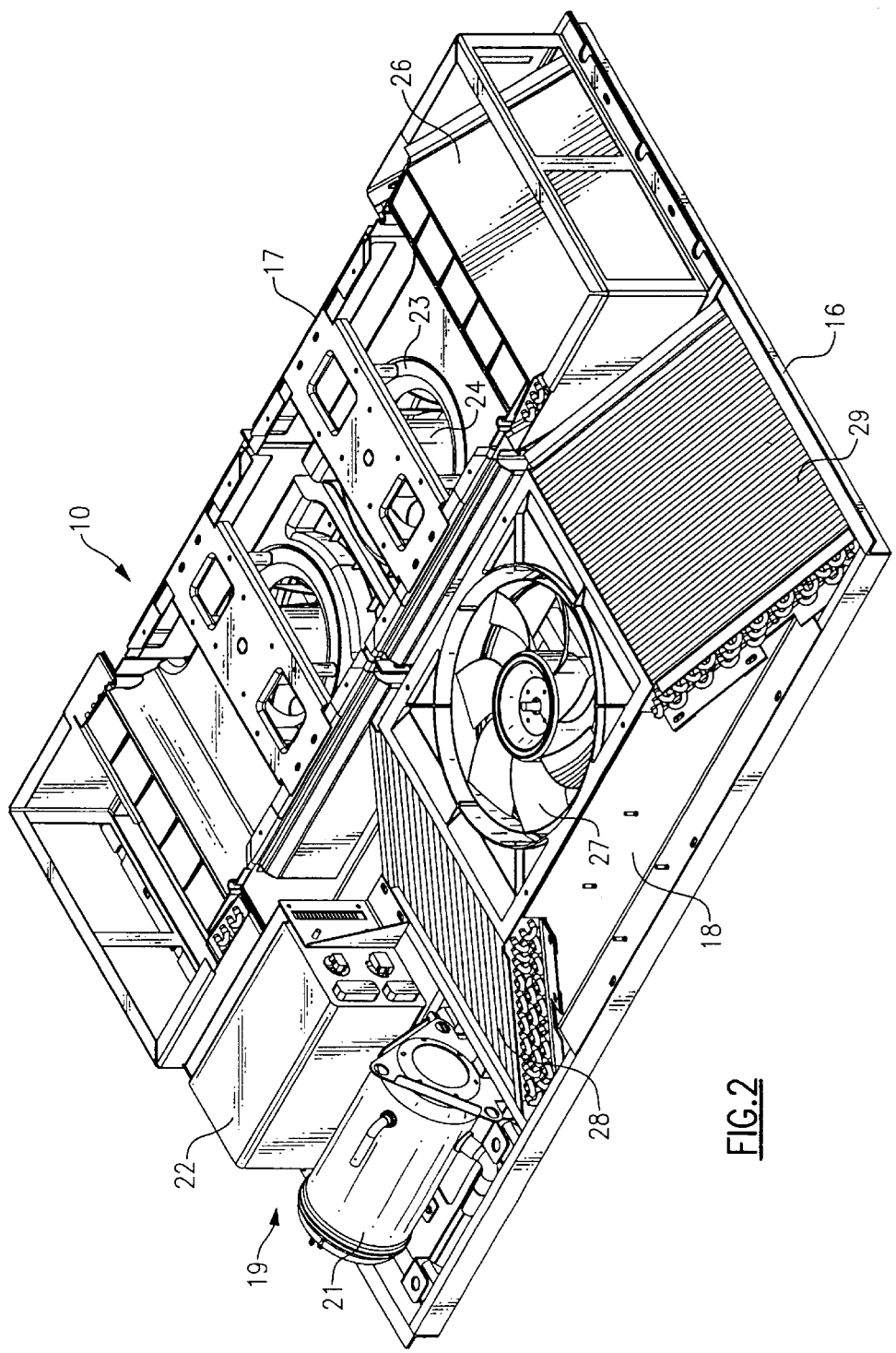
FIG. 2 is a perspective view of a module with the top cover removed.

In FIG. 2, the module 10 is shown with its cover removed to include a frame 16 with an evaporator section 17 attached to one end thereof and a condenser section 18 attached to the other end thereof. Adjacent the condenser section 18 is a power section 19 which includes a compressor 21 and an inverter/controller 22. The manner in which they provided motive power to the refrigerant circuit and electrical power to the electrical components of the module 10 will be more fully described hereinafter.

The evaporator section 17 comprises a pair of identical units in abutting end-to-end relationship with each unit including an evaporator blower 23 with is evaporator blower motor 24, and an evaporator coil 26. Briefly, the evaporator blower 23 draws in return air from the passenger compartment of the bus, and fresh air from outside and passes a mixture of the two through the evaporator coil 26 to be conditioned, after which it flows back to the passenger compartment by way of the supply air ducts. This will be more fully described hereinafter.

Within the condenser section 18, there is provided a condenser fan 27 driven by an electric motor, and a pair of condenser coils 28 and 29. Briefly, the condenser fan draws air upwardly to create a vacuum below, which in turn causes fresh air to be drawn through the condenser coils 28 and 29 to condense the refrigerant flowing through the coils 28 and 29. The resulting warm air is then discharged upwardly to the atmosphere by the fan 27.

Figure 3:
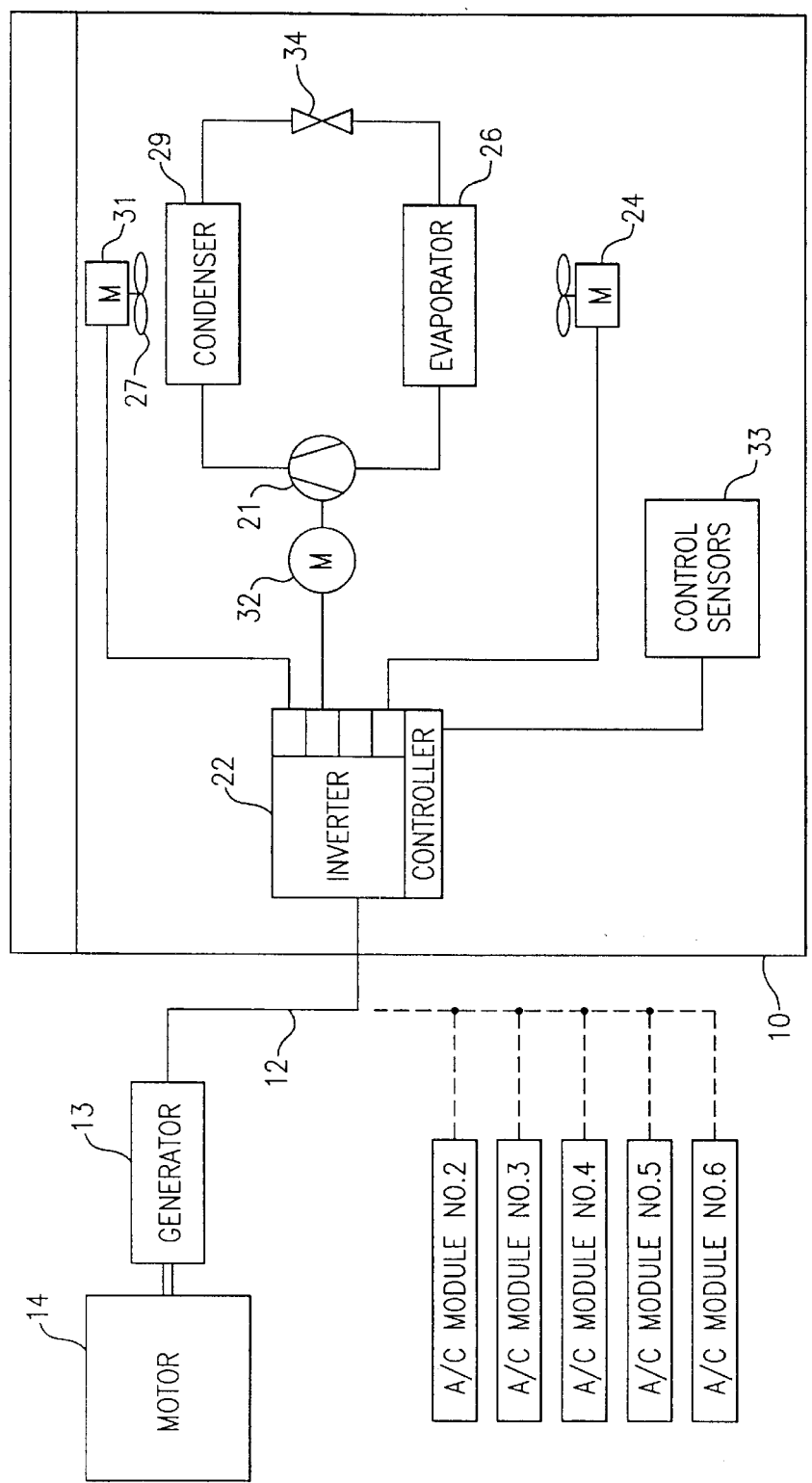
FIG. 3 is a schematic illustration of the electrical and refrigerant circuits within the module in accordance with the preferred embodiment of the invention.

Referring now to FIG. 3, the module 10 is shown with its electrical connection by way of line 12 to the generator 13 and driving motor 14. The inverter/controller 22 receives AC power from the generator, or alternator, and, in turn provides discretely controlled AC power to the evaporator blower motor 24, the drive motor 31 of the condenser fan 27 and the drive motor 32 of the compressor 21. A plurality of control sensors, shown generally at 33 provide feedback to the inverter/controller 22 as necessary for it to control the AC power being delivered to the various drive motors.

As will be seen, the refrigeration circuit is a closed circuit through which the refrigerant flows from the compressor 21 to the condenser 29, an expansion valve 34, the evaporator 26 and finally back to the compressor 21. This is accomplished in a conventional manner.

It will be seen that the module 10 is self-contained with all of the necessary components, with the only input thereto being the electrical power by way of the electrical line 12. Other modules, indicated as numbers 2–6 are identically configured and are powered and controlled in the same manner.

Returning now to the condenser section 18 as shown in FIG. 4, the flow of air as caused by the condenser fan 27 is shown by the arrows. Fresh air is drawn in through the fresh air intake openings 36 and 37, passes through the respective condenser coils 28 and 29 and then flow upwardly through the condenser fan 27 and the condenser outlet air opening 38 as shown.

Within the evaporator section 17 as shown in FIG. 5, the relatively warm return air flows upwardly from a return air duct communicating with the passenger compartment and enters a return air compartment 39 of the evaporator section 17 as shown by the arrows. The evaporator blower 23 causes the return air to flow upwardly to its inlet at the top, and at the same time, fresh air may be brought in by way of a fresh air flap in a manner to be described hereinafter. A mixture of the two airflow streams is thus admitted at the intake of the evaporator blower 23 and caused to flow downwardly and outwardly as indicated by the arrows to the evaporator coils 26. After passing through the evaporator coil 26 it is then caused by a curved cowling 41 to flow downwardly to a supply air duct leading to the passenger compartment. Thus, while the module is operating, there is a constant circuitous flow of return air out of the passenger compartment and of conditioned air back into the passenger compartment. The amount of return air that is discharged to the outside, and also the amount of fresh air that is brought into the circuit from the outside is controlled by the selective movement of the fresh air flaps as will be described hereinafter.

There are shown in FIGS. 6–8, installations of the module 10 with various types of buses and associated return air and supply air ducts. In FIG. 6, for example, a wide bus installation is shown wherein the existing duct work within the bus includes supply air ducts 43 and 44 near the lateral sides of the bus, and return air ducts 46 and 47 that are closer to the center line of the bus, but are substantially spaced apart. Here it will be seen that the return air ducts 46 and 47 communicate directly with the return air compartment 39 of the module 10, but at a position at near the outer end thereof. Cowlings 35 fluidly interconnect the flow from the evaporator coils 26 with the supply air ducts 43 and 44.

In FIG. 7, which shows a narrow bus installation, again the supply air ducts 48 and 49 are near the transverse sides of the bus. But the return air ducts 51 and 52 are abutting each other at the center line of the bus. Again, the return air ducts 51 and 52 fluidly communicate with the return air compartment 39, but at the other end thereof. Smaller cowlings 40 fluidly interconnect the conditioned air discharge to the supply air ducts 48 and 49.

Finally, in FIG. 8 there is shown a curved top bus wherein the supply air ducts 53 and 54 are again near the transverse sides of the bus, but the return air ducts 56 and 57 are in intermediate positions, relatively close to the center line but substantially spaced apart. Again, the return air ducts 56 and 57 fluidly communicate with the return air compartment 39, but at a position intermediate the two ends thereof. Cowlings 45 interconnect the conditioned air flow from the evaporator coils 26 to the respective supply air ducts 53 and 54.

It will thus be seen that a single module is so designed and constructed that it can accommodate any of these various installation requirements without modification of the module itself. That is, the conditioned air discharge opening 50 is sufficiently large in the transverse direction to accommodate the various supply air duct orientations, and, more importantly, the return air compartment 39 is relatively large in the transverse direction so as to accommodate each of the various types of return air duct configurations as shown.

As will be seen in the configurations shown in FIGS. 6–8, even though the modules themselves are identical for the various installation requirements, the cowlings 35, 40 and 45 must be uniquely designed to accommodate the particular installation arrangement. That is, the cowling 35 for a wide bus arrangement must be larger then the cowling 40 for a narrow bus installation. More importantly, however, is that with this arrangement, the cowlings must be substantially air tight in order to ensure that most, if not all of the conditioned air reaches the supply air ducts and does not leak out to the atmosphere. Similarly, those cowlings must be substantially water tight so as to preclude the leakage of moisture from outside into the supply air ducts. These problems are addressed by the use of a flexible duct arrangement as shown in FIGS. 9–12.

Figure 9:
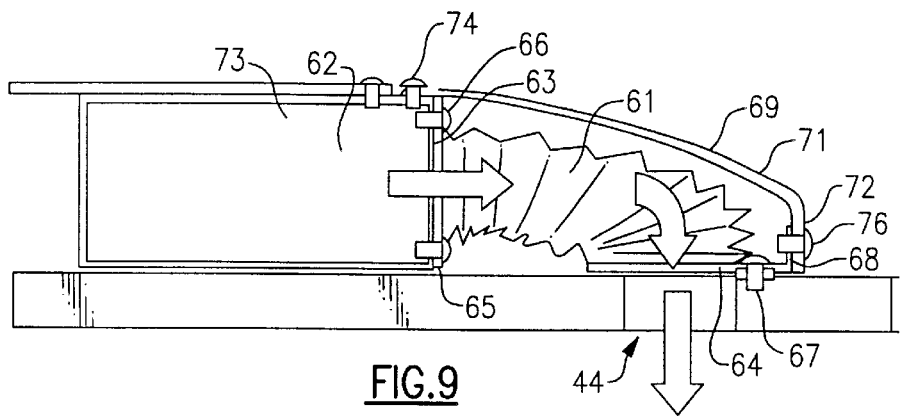
FIGS. 9–11 are front elevational views of the flexible duct arrangement of the present invention as applied to different types of bus rooftops.
Figure 12:
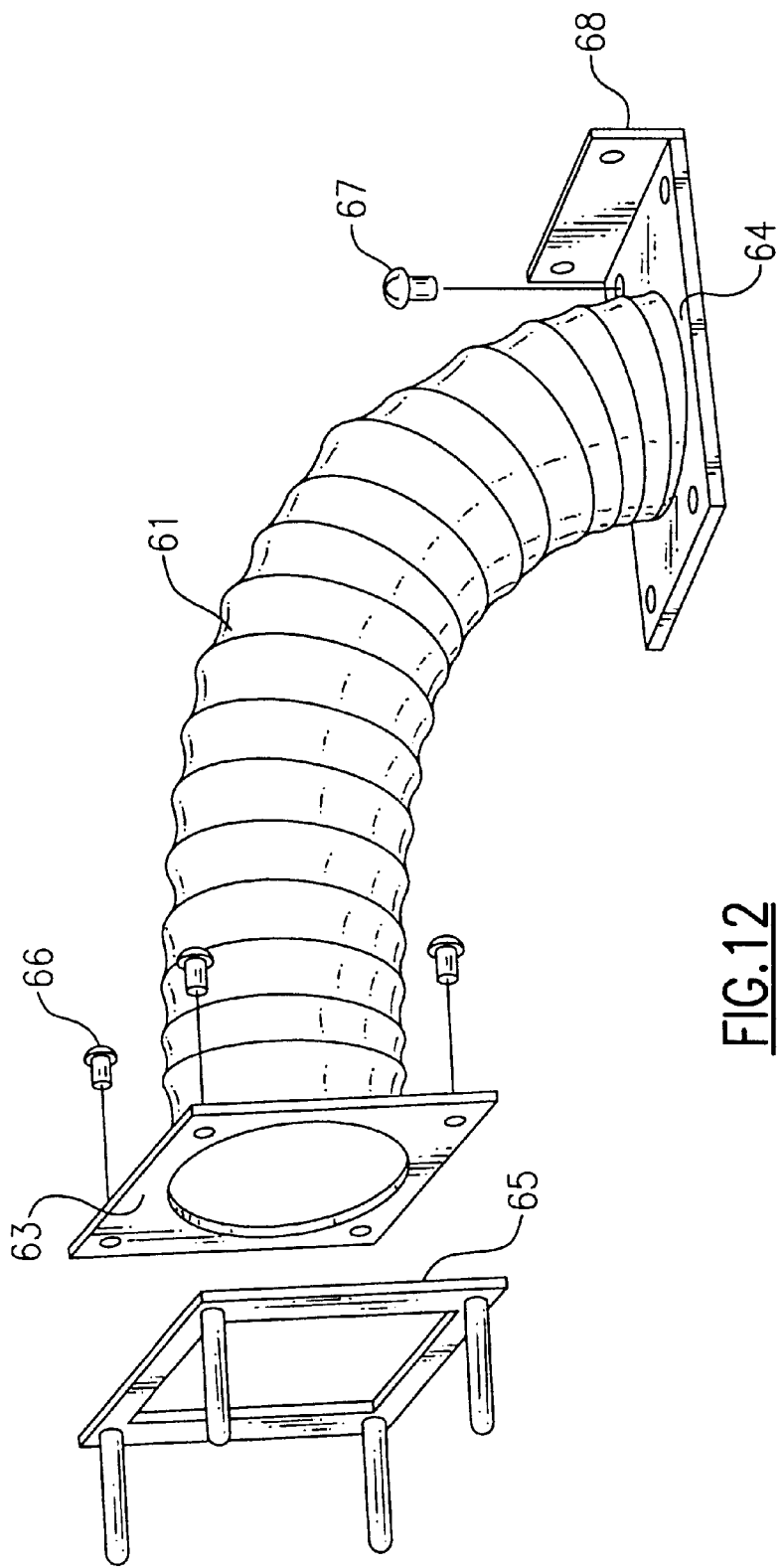
FIG. 12 is a perspective view of a flexible duct with end plates in accordance with a preferred embodiment of the invention.

In FIG. 9, the module is shown as installed on a flat, wide bus roof having a supply air duct 44. A flexible duct 61 is installed to fluidly interconnect the evaporator compartment 62 to the supply air duct 44. Connection at each end is accomplished by use of end plates or flanges 63 and 64 which are connected, and preferably, integrally formed with the flexible duct 61 as shown in FIG. 12. The flexible duct is made from any air tight, flexible material such as a plastic cloth or elastomeric material, and the end plates 63 and 64 are made of a metal or elastomeric material which is sufficiently rigid to accommodate a rigid attachment to the corresponding structure. That is, the end plate 63 is secured to the evaporator outlet frame 64 by fasteners 66, and the end plate 64 is securely fastened to the rooftop by fasteners 67 as shown in FIG. 9.

Figure 10:
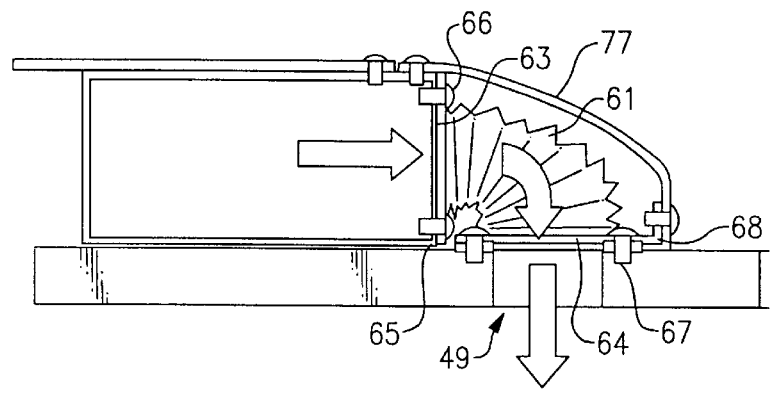
Figure 11:
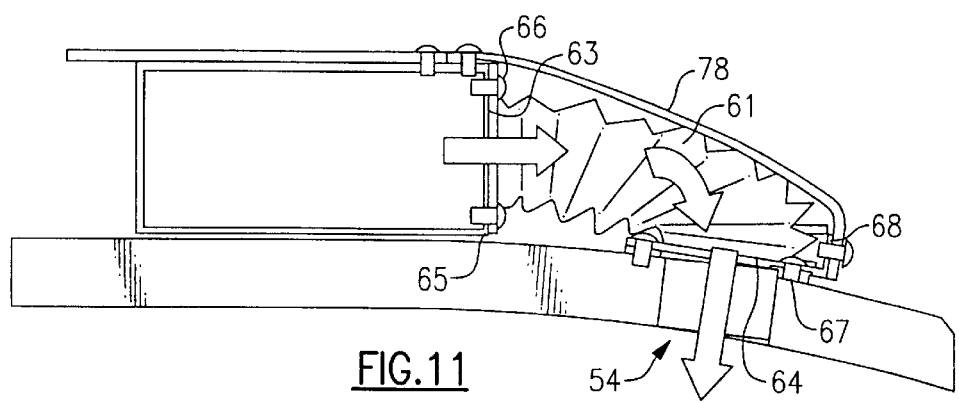

In the FIGS. 10 and 11 embodiments, which show use with a narrow width bus roof and a curved bus roof, respectively, the same flexible duct 61 with it end plates 63 and 64 are secured in the same manner, the difference being that the flexible duct is selectively stretched out to a different extent. This allows the same module, with the same flexible duct to be used in all three different types of installations.

In order to provide a finished appearance, and to protect the flexible duct 61 from the outside elements, it is necessary to provide a duct cover or cowling, which, because of the different configurations, must necessarily be uniquely designed to fit the particular arrangement. However, there are certain features that are common to each in order to provide a standard, effective attachment means. In this regard, reference is made to FIG. 12 wherein the end plate 64 is shown to include an upstanding flange 68 at its outside edge. This upstanding flange allows for interconnection of the lower end of the cover or cowling by way of a plurality of fasteners.

Referring again to FIG. 9, a cowling 69 has a rather long flat upper portion 71 and a rather short downwardly extending portion 72. The upper portion 71 is secured to the module top structure 73 by a plurality of fasteners 74, while the bottom portion 72 is secured to the upstanding flange 68 by a plurality of fasteners 76. In a similar manner, the cowlings 77 and 78 are secured in place as shown in FIGS. 10 and 11, respectively. In this manner, the cowlings, which are generally made of a suitable material such as a flexible plastic or sheet metal, are fastened to the bracket 68 and the module top structure 73 to form a continuation of the module cover transition to the roof and also provide protection from the elements and damage to the duct disposed therebelow. The upstanding flange 68 is properly positioned by its associated end plate 64 such that the appropriate cowling 69, 77 or 78 will be maintained in the proper position on the roof of the bus to provide an esthetic and protective function.

Although the duct 61 has been shown and described as a single duct of uniform diameter, it may as well be of other shapes, sizes and configurations. For example, it may be rectangular or elliptical in cross sectional shape, or it may comprise a pair on other plurality of side by side duct like elements.

While this invention has been described with reference to a particular structure disclosed herein, it should be understood that it is not confined to the details set forth in this application, but is rather intended to cover any modifications and changes as may come within the scope of the following claims.

We claim:

1. An air conditioning module for a bus rooftop of the type having at least one return air opening for conducting the flow of return air from a passenger compartment, and at least one supply air opening for conducting the flow of conditioned air to the passenger compartment comprising:
   a condenser section having at least one condenser coil and a condenser fan for causing ambient air to flow therethrough;
   an evaporator section having at least one evaporator coil and at least one evaporator fan for causing return air to flow from said return air opening through said evaporator section and to the at least one supply air opening; and
   a flexible duct for fluidly interconnecting said evaporator section and said at least one supply air opening, said flexible duct being substantially adjustable in length to accommodate various distances between said evaporator section and said supply air opening.

2. An air conditioning module as set forth in claim 1 and including a plate attached to each end of said flexible duct and means for fastening in an air tight connection, said plates to the evaporator section and supply air opening, respectively.

3. An air conditioning module as set forth in claim 2 wherein said plates are integrally attached to said flexible duct.

4. An air conditioning module as set forth in claim 1 and including a cowling attached at its one end to said module and at its other end near said supply air opening, said cowling providing a protective cover over said flexible duct.

5. An air conditioning module as set forth in claim 2 wherein one of said plates includes an upstanding flange for interconnection with a cover.

6. An air conditioning module as set forth in claim 5 wherein said cover comprising an outer cowling attached at its one end to said module and at its other end near said supply air opening, said cowling providing a protective cover over said flexible duct.

7. An air conditioning module as set forth in claim 1 wherein said at least one supply air opening comprises two supply air openings, with one on each side of the bus.

8. An air conditioning module as set forth in claim 7 wherein said at least one evaporator coil comprises two evaporator coils, with one on either side of the bus.

9. An air conditioning module as set forth in claim 7 wherein said at least one evaporator fan comprises two evaporator fans, with each fan operating to blow air through its respective evaporator coil.

10. An air conditioning module for installation on the rooftop of a bus having at least one supply air opening in the rooftop for fluid communication with a supply air duct leading to a passenger compartment and at least one return air opening in the rooftop to fluidly communicate with the return air duct leading from the passenger compartment comprising:
   a housing;

at least one refrigeration circuit disposed in said housing and including at least one evaporator coil and at least one condenser coil;

an evaporator section contained in said housing and having an evaporator coil and associated fan for causing the flow of air from the return air duct, through said evaporator coil and through a supply air discharge opening in said housing;

a flexible duct fluidly interconnecting said supply air discharge opening and said at least one supply air opening, said flexible duct being substantially adjustable in length to accommodate varying distances between said supply air discharge opening and said at least one supply air opening.

11. An air conditioning module as set forth in claim 10 and including a plate attached to each end of the flexible duct and means for fastening in an air tight connection, said plates to said supply air discharge opening and said at least one supply air opening, respectively.

12. An air conditioning module as set forth in claim 11 wherein said plates are integrally attached to said flexible duct.

13. An air conditioning module as set forth in claim 10 and including a cowling attached at its one end to said module and at its other end near said at least one supply air opening, said cowling providing a protective cover over said flexible duct.

14. An air conditioning module as set forth in claim 11 wherein one of said plates includes an upstanding flange for interconnection with a cover.

15. An air conditioning module as set forth in claim 14 wherein said cover comprising a cowling attached at its one end to said module and at its other end near said at least one supply air opening, said cowling providing a protective cover over said flexible duct.

16. An air conditioning module as set forth in claim 10 wherein said evaporator fan is operative to blow air through said evaporator coil.

17. An air conditioning module as set forth in claim 10 wherein said at least one supply air opening is located near an outer side of the bus.

18. A bus air conditioning system with an air conditioning module installed on a bus roof having a supply air opening for conducting the flow of conditioned air downwardly near the outer side of the roof and the return air opening near the longitudinally central axis of the bus comprising:

a refrigeration circuit for circulating refrigerants serially through a compressor, a condenser coil, an expansion valve and an evaporator coil;

an evaporator section including an evaporator blower for causing air to flow from said return air opening, into a return air compartment of said evaporator section, through said blower, through said evaporator coil and then through a supply air discharge opening; and a flexible duct fluidly interconnecting said supply air discharge opening in said supply air opening, said flexible duct being substantially adjustable in length to accommodate various distances between said evaporator section and said supply air opening.

19. A bus air conditioning system as set forth in claim 18 and including a plate attached to each end of the said flexible duct and means for fastening said plates to said supply air discharge opening and supply air opening, respectively.

20. A bus air conditioning system as set forth in claim 19 wherein said plates are integrally attached to said flexible duct.

21. A bus air conditioning system as set forth in claim 18 and including a cowling attached at its one end to said module and at its other end near supply air opening, said cowling providing a protecting cover over said flexible duct.

22. A bus air conditioning system as set forth in claim 19 wherein one of said plates includes an upstanding flange for interconnection with a cover.

23. A bus air conditioning system as set forth in claim 22 wherein said cover comprises a cowling attached at is one end to said module and at its other end near said supply air opening, said cowling providing a protective cover over said flexible duct.

24. A bus air conditioning system as set forth in claim 18 wherein said roof supply air opening is located near the side edges of the bus.

25. An air conditioning module as set forth in claim 18 wherein said roof return air opening is located near a longitudinal centerline of the bus.

26. An air conditioning module as set forth in claim 18 wherein said bus roof is curved in transverse cross sectional shape.

* * * * *